United States Patent
Khavari et al.

(10) Patent No.: US 12,421,332 B2
(45) Date of Patent: *Sep. 23, 2025

(54) SHELF-STABLE BUILD MATERIALS FOR 3D PRINTING

(71) Applicant: 3D Systems, Inc., Rock Hill, SC (US)

(72) Inventors: Mehrgan Khavari, Corvallis, OR (US); Khalil Moussa, Chapel Hill, NC (US); Scott Broce, Rock Hill, SC (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/733,455

(22) Filed: Jun. 4, 2024

(65) Prior Publication Data
US 2024/0317909 A1  Sep. 26, 2024

Related U.S. Application Data

(63) Continuation of application No. 18/096,943, filed on Jan. 13, 2023, now Pat. No. 12,030,968, which is a continuation of application No. 17/060,552, filed on Oct. 1, 2020, now Pat. No. 11,584,811.

(60) Provisional application No. 62/909,024, filed on Oct. 1, 2019.

(51) Int. Cl.
*C08F 20/36* (2006.01)
*B33Y 70/00* (2020.01)
*C09D 11/101* (2014.01)

(52) U.S. Cl.
CPC ............ *C08F 20/36* (2013.01); *B33Y 70/00* (2014.12); *C09D 11/101* (2013.01)

(58) Field of Classification Search
None
See application file for complete search history.

(56) References Cited

U.S. PATENT DOCUMENTS

| | | | |
|---|---|---|---|
| 7,211,368 B2 | 5/2007 | Coats et al. | |
| 11,377,538 B2 * | 7/2022 | Khavari | B33Y 70/00 |
| 11,584,811 B2 * | 2/2023 | Khavari | B33Y 70/00 |
| 2004/0135292 A1 | 7/2004 | Coats et al. | |
| 2014/0017460 A1 | 1/2014 | Xu et al. | |
| 2021/0095094 A1 | 4/2021 | Khavari et al. | |

FOREIGN PATENT DOCUMENTS

| | | | |
|---|---|---|---|
| JP | 2016536434 A | 11/2016 | |
| JP | 2018111240 A | 7/2018 | |
| JP | 2018154092 A | 10/2018 | |
| JP | 2019517933 A | 6/2019 | |
| WO | 2006107759 A2 | 10/2006 | |
| WO | 2015038714 A1 | 3/2015 | |
| WO | 2020182810 A1 | 9/2020 | |
| WO | 2020182814 A1 | 9/2020 | |

OTHER PUBLICATIONS

European Patent Communication for European Patent Application 20828579.1 dated Jun. 27, 2024 (5 pages).
International Search Report and Written Opinion issued in counterpart PCT Application No. PCT/US2020/053698 dated Feb. 22, 2021.
English translation of the First Office Action for Japanese Application No. 2022-520006, dated Apr. 6, 2023 (3 pages).
Dehoff, "Engineering of Microstructures", Materials Research, vol. 2, No. 3, 111-126, 1999.
Kohn et al., "Connecting Structure-Property and Structure-Function Relationships across the Disciplines of Chemistry and Biology: Exploring Student Perceptions", CBE-Life Sciences Education, vol. 17, No. 2, ar33, 1-15, 2018.
"Materials science", Wikipedia, 1-18, Accessed Feb. 4, 2022, URL: https://en.wikipedia.org/wiki/Materials_science.
Aguilera et al., "Structure-Property Relationships in Foods", Food Materials Science: Principles and Practice, Chapter 12, 229-253, 2008.

* cited by examiner

*Primary Examiner* — Sanza L. McClendon
(74) *Attorney, Agent, or Firm* — Maynard Nexsen PC; John P. Zimmer

(57) ABSTRACT

Build materials for 3D printing applications are described herein which, in some embodiments, comprise monomeric species operable for producing articles with high $T_g$ and/or high heat deflection temperature while maintaining shelf stability. In one aspect, a polymerizable liquid comprises at least 20 weight percent isocyanurate polyacrylate; a photoinitiator component; and a crystallization inhibitor component comprising monomeric curable material, oligomeric curable material or mixtures thereof, wherein the polymerizable liquid does not exhibit crystallization over a period of 28 days at a storage temperature of 5-10° C.

13 Claims, No Drawings

SHELF-STABLE BUILD MATERIALS FOR 3D PRINTING

RELATED APPLICATION DATA

The present application is a continuation of U.S. patent application Ser. No. 18/096,943 filed Jan. 13, 2023, which is a continuation of U.S. patent application Ser. No. 17/060,552 filed Oct. 1, 2020, now U.S. Pat. No. 11,584,811 issued on Feb. 21, 2023, which claims priority pursuant to 35 U.S.C. § 119 (e) to United States Provisional Patent Application Ser. No. 62/909,024 filed Oct. 1, 2019, each of which is incorporated herein by reference in its entirety.

FIELD

The present invention relates to three-dimensional build materials and, in particular, to shelf-stable polymerizable liquids for printing three-dimensional articles exhibiting high heat deflection temperatures.

BACKGROUND 3D printers employ build materials, which are also known as inks, to form various 3D objects, articles, or parts in accordance with computer generated files. In some instances, the build material is solid at ambient temperatures and converts to liquid at elevated jetting temperatures. In other instances, the build material is liquid at ambient temperatures.

Build materials can comprise a variety of chemical species. Chemical species included in a build material can be selected according to various considerations including, but not limited to, desired chemical and/or mechanical properties of the printed article and operating parameters of the 3D printing apparatus. In some cases, articles exhibiting high glass transition temperature ($T_g$) and/or high heat deflection temperature are desired. However, monomeric species operable to produce these high temperature properties are often unstable and undergo crystallization or other phase separation processes when stored in the liquid phase.

Moreover, hybrid compositions have been introduced comprising light curable components and heat curable components. A significant disadvantage of hybrid systems is the requirement of multiple processing steps to provide the final article. The hybrid composition, for example, must undergo light curing and heat curing processes. Additionally, the heat curing step can brown or discolor the article.

SUMMARY

In view of these disadvantages, build materials for 3D printing applications are described herein which, in some embodiments, comprise monomeric species operable for producing articles with high $T_g$ and/or high heat deflection temperature while maintaining shelf stability. In one aspect, a polymerizable liquid comprises at least 20 weight percent isocyanurate polyacrylate; a photoinitiator component; and a crystallization inhibitor component comprising monomeric curable material, oligomeric curable material or mixtures thereof, wherein the polymerizable liquid does not exhibit crystallization over a period of 28 days at a storage temperature of 5-10° C. Weight percent of various components or ingredients recited herein are based on the total weight of the polymerizable liquid.

In some embodiments, the monomeric curable material comprises a heterocycle having two or more unsaturated substituents. For example, the heterocycle can comprise a polyallylated heterocycle, in some embodiments.

In another aspect, methods of printing three-dimensional articles are described herein. A method comprises providing a polymerizable liquid comprising at least 20 weight percent isocyanurate polyacrylate; a photoinitiator component; and a crystallization inhibitor component comprising monomeric curable material, oligomeric curable material or mixtures thereof, wherein the polymerizable liquid does not exhibit crystallization over a period of 28 days at a storage temperature of 5-10° C. The polymerizable liquid is cured with light to form the article, the article having a post-light curing heat deflection temperature of at least 100° C. In some embodiments, the article has a post-light curing heat deflection temperature of at least 200° C. or at least 250° C. Heat deflection temperatures of printed articles described herein are determined according to ASTM D648 at a stress of 1.82 MPa. In some embodiments, the article is formed via a layer-by-layer process, wherein layer formation is administered via deposition and irradiation of a layer of the polymerizable liquid.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

In one aspect, polymerizable liquids for use in 3D printing applications are described herein. The polymerizable liquids, for example, can be employed in a variety of different 3D printers, such as those based on Stereolithography (SLA), Digital Light Processing (DLP), and Multi-Jet Printing (MJP). A polymerizable liquid comprises at least 20 weight percent isocyanurate polyacrylate; a photoinitiator component; and a crystallization inhibitor component comprising monomeric curable material, oligomeric curable material or mixtures thereof, wherein the polymerizable liquid does not exhibit crystallization over a period of 28 days at a storage temperature of 5-10° C.

Turning now to specific components, any isocyanurate polyacrylate consistent with achieving the objectives described herein can be employed in the polymerizable liquid. In some embodiments, the isocyanurate comprises at least two acrylate substituents or methacrylate substituents. The isocyanurate, for example, can comprise three acrylate substituents or methacrylate substituents. In some embodiments, the isocyanurate polyacrylate is of Formula I:

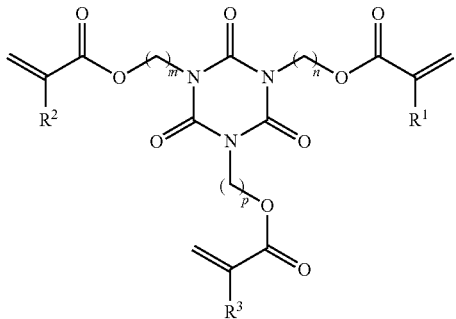

wherein $R^1$-$R^3$ are independently selected from the group consisting of hydrogen and alkyl and m, n, and p are integers independently ranging from 1 to 10.

In some embodiments, the isocyanurate polyacrylate is present in an amount of at least 30 weight percent or at least 40 weight percent, based on total weight of the polymerizable liquid. The isocyanurate polyacrylate can also be present in an amount of 30-60 weight percent, based on total weight percent of the polymerizable liquid.

As described herein, the crystallization inhibitor component comprises a monomeric curable material, an oligomeric curable material, or mixtures thereof. A curable material, for reference purposes herein, comprises a chemical species that includes one or more curable or polymerizable moieties. A "polymerizable moiety," for reference purposes herein, comprises a moiety that can be polymerized or cured to provide a printed 3D article or object. Such polymerizing or curing can be carried out in any manner not inconsistent with the objectives of the present disclosure. In some embodiments, for example, polymerizing or curing comprises irradiating a polymerizable or curable material with electromagnetic radiation having sufficient energy to initiate a polymerization or cross-linking reaction. For instance, in some cases, ultraviolet (UV) radiation can be used. Thus, in some instances, a polymerizable moiety comprises a photopolymerizable or photo-curable moiety, such as a UV-polymerizable moiety. In some embodiments, a curable material described herein is photo-polymerizable or photo-curable at wavelengths ranging from about 300 nm to about 400 nm or from about 320 nm to about 380 nm. Alternatively, in other instances, a curable material is photo-polymerizable at visible wavelengths of the electromagnetic spectrum.

Moreover, a polymerization reaction, in some cases, comprises a free radical polymerization reaction, such as that between points of unsaturation, including points of ethyleneic unsaturation. Other polymerization reactions may also be used. As understood by one of ordinary skill in the art, a polymerization reaction used to polymerize or cure a curable material described herein can comprise a reaction of a plurality of "monomers" or chemical species having one or more functional groups or moieties that can react with one another to form one or more covalent bonds.

One non-limiting example of a polymerizable moiety of a curable material described herein is an ethyleneically unsaturated moiety, such as a vinyl moiety, allyl moiety, or (meth)acrylate moiety, where the term "(meth)acrylate" includes acrylate or methacrylate or a mixture or combination thereof.

Additionally, a monomeric curable material and/or an oligomeric curable material described herein can comprise a monofunctional, difunctional, trifunctional, tetrafunctional, pentafunctional, or higher functional curable species. A "monofunctional" curable species, for reference purposes herein, comprises a chemical species that includes one curable or polymerizable moiety. Similarly, a "difunctional" curable species comprises a chemical species that includes two curable or polymerizable moities; a "trifunctional" curable species comprises a chemical species that includes three curable or polymerizable moieties; a "tetrafunctional" curable species comprises a chemical species that includes four curable or polymerizable moieties; and a "pentafunctional" curable species comprises a chemical species that includes five curable or polymerizable moieties. Thus, in some embodiments, a monofunctional curable material comprises a mono(meth)acrylate, a difunctional curable material comprises a di(meth)acrylate, a trifunctional curable material comprises a tri(meth)acrylate, a tetrafunctional curable material comprises a tetra(meth)acrylate, and a pentafunctional curable comprises a penta(meth)acrylate. Other monofunctional, difunctional, trifunctional, tetrafunctional, and pentafunctional curable materials may also be used.

Any monomeric curable material or combination of monomeric curable materials not inconsistent with the objectives of the present disclosure may be used. In some embodiments, a monomeric curable material of a polymerizable liquid described herein comprises one or more species of acrylates and/or (meth)acrylates, such as one or more monofunctional, difunctional, trifunctional, tetrafunctional acrylates or (meth)acrylates, and/or pentafunctional (meth) acrylates. In some embodiments, for instance, a monomeric curable material comprises methyl (meth)acrylate, ethyl (meth)acrylate, n-propyl(meth)acrylate, n-butyl(meth)acrylate, isobutyl (meth)acrylate, n-hexyl(meth)acrylate, 2-ethylhexyl(meth)acrylate, n-octyl(meth)acrylate, n-decyl (meth)acrylate, n-dodecyl(meth)acrylate, 2-hydroxyethyl (meth)acrylate, 2- or 3-hydroxypropyl(meth)acrylate, 2-methoxyethyl(meth)acrylate, 2-ethoxyethyl(meth)acrylate, 2- or 3-ethoxypropyl(meth)acrylate, tetrahydrofurfuryl methacrylate, isobornyl acrylate, isobornyl (meth)acrylate, acryloyl morpholine, isobornyl acrylate, isobornyl methacrylate, 2-(2-ethoxyethoxy)ethyl acrylate, cyclohexyl methacrylate, 2-phenoxyethyl acrylate, glycidyl acrylate, isodecyl acrylate, 2-phenoxyethyl(meth)acrylate, lauryl methacrylate, or a combination thereof. In some embodiments, a monomeric curable material comprises one or more of allyl acrylate, allyl methacrylate, triethylene glycol di(meth)acrylate, tricyclodecane dimethanol diacrylate, and cyclohexane dimethanol diacrylate. Additionally, in some cases, a monomeric curable material comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, tripropylene glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, or bisphenol S. A monomeric curable material described herein may also comprise 1,1-trimethylolpropane tri(meth)acrylate, pentaerythritol monohydroxy tri(meth)acrylate, dipentaerythritol monohydroxy penta(meth)acrylate, and/or bis(trimethylolpropane) tetra(meth)acrylate. Further, in some cases, a monomeric curable material can comprise an ethoxylated or propoxylated species, such as ethoxylated or propoxylated neopentyl glycol, ethoxylated or propoxylated bisphenol A, ethoxylated or propoxylated bisphenol F, ethoxylated or propoxylated bisphenol S, ethoxylated or propoxylated 1,1, 1-trimethylolpropanetri(meth)acrylate, or ethoxylated or propoxylated glycerol tri(meth)acrylate. In some cases, a monomeric curable material comprises a cycloaliphatic epoxy or N-vinylpyrrolidone.

Additional non-limiting examples of commercially available monomeric curable materials useful in some embodiments described herein include the following: isobornyl acrylate (IBOA), commercially available from SARTOMER under the trade name SR 506; isobornyl methacrylate, commercially available from SARTOMER under the trade name SR 432A; triethylene glycol diacrylate, commercially available from SARTOMER under the trade name SR 272; triethylene glycol dimethacrylate, commercially available from SARTOMER under the trade name SR 205; tricyclodecane dimethanol diacrylate, commercially available from SARTOMER under the trade name SR 833S; 2-phenoxyethyl acrylate, commercially available from SARTOMER under the trade name SR 339; ethyoxylated (3 mole)bisphenol A diacrylate, commercially available from SARTOMER under the trade name SR 349; a cyclic monofunctional acrylate, commercially available by RAHN USA Corp. under the trade name GENOMER 1120; and dipentaerythritol pentaacrylate, commercially available from SARTOMER under the trade name SR 399 LV. Other commercially available monomeric curable materials may also be used.

The monomeric curable material, in some embodiments, is selected from the group consisting of aliphatic diacrylates, aliphatic dimethacrylates, cycloalkyl diacrylates, isobornyl acrylate, isobornyl methacrylate, and mixtures thereof.

The monomeric curable material can be present in the polymerizable liquid in any amount not inconsistent with the objectives described herein. In some embodiments, the monomeric curable material is present in an amount of 1-60 weight percent, based on total weight of the polymerizable liquid. The monomeric curable material may also be present in an amount of 5-50 weight percent or 20-40 weight percent, based on total weight of the polymerizable liquid.

In some embodiments, the monomeric curable material comprises a heterocycle comprising two or more unsaturated substituents. The substituted heterocycle, for example, can comprise three unsaturated substituents. The heterocycle can be polyallylated, in some embodiments. In being polyallylated, the heterocycle comprises two of more allyl substituents. For example, a polyallylated heterocycle can comprise a polyallyl isocyanurate. Alternatively, a heterocycle comprising two or more unsaturated substituents can be of Formula II:

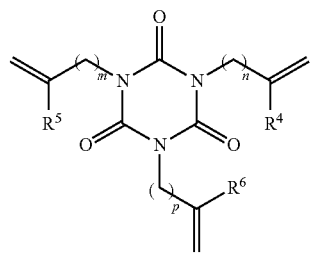

wherein $R^4$-$R^6$ are independently selected from the group consisting of hydrogen and alkyl and m, n, and p are integers independently ranging from 1 to 10.

The heterocycle comprising two or more unsaturated substituents, including the heterocycle of Formula II, can be present in the polymerizable liquid in any amount not inconsistent with the objectives described herein. In some embodiments, the heterocycle is present in an amount of 5-30 weight percent, based on total weight of the polymerizable liquid.

In some embodiments, a ratio of the isocyanurate polyacrylate to the heterocycle comprising two or more unsaturated substituents is 1:4 to 4:1 or 1:3 to 3:1. The ratio of isocyanurate polyacrylate to the heterocycle comprising two or more unsaturated substituents, for example, can be about 1:1.

The crystallization inhibitor, in some embodiments, comprises an oligomeric curable material. The oligomeric curable material can be sole ingredient of the crystallization inhibitor component or can be in a mixture with the monomeric curable material. In general, any oligomeric curable material not inconsistent with the objectives of the present disclosure may be used in an ink described herein. In some embodiments, the oligomeric curable material comprises a diacrylate and/or dimethacrylate of esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis (4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S. An oligomeric curable material can comprise urethane diacrylate, urethane dimethacrylate, aliphatic urethane diacrylate, aliphatic urethane dimethacrylate, polyester diacrylate, polyester dimethacrylate, or mixtures thereof. Some non-limiting commercially available oligomeric materials include BOMAR BR-952 from DYMAX, CN1964 from SARTOMER, Genomer 4247 from RAHN USA, and/or oligomeric materials under the EBECRYL® trade designation from ALLNEX, such as EBECRYL®5781, 5850, 7320 and/or 4859.

Oligomeric curable material of the crystallization inhibitor can be present in the polymerizable liquid in any amount not inconsistent with the objectives described herein. In some embodiments, for example, oligomeric curable material is present in an amount of 5-50 weight percent or 10-40 weight percent, based on total weight of the polymerizable liquid. In some embodiments, oligomeric curable is present in an amount of 0-50 weight percent or 0-40 weight percent, based on total weight of the polymerizable liquid.

Polymerizable liquids described herein also comprise a photoinitiator component for initiating polymerization or curing of the liquid. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 420 nm or between about 300 nm and about 385 nm, to yield free radical(s).

Examples of alpha cleavage photoinitiators are Irgacure 184 (CAS 947-19-3), Irgacure 369 (CAS 119313-12-1), and Omnirad (Irgacure) 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzyl ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, polymerizable liquids containing ionic dye-counter ion compounds can be polymerized upon exposure to visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a polymerizable liquid described herein in any amount not inconsistent with the objectives of the present disclosure. In some embodiments, a photoinitiator is present in an amount of up to about 5 wt. %, based on the total weight of the polymerizable liquid. In some cases, a photoinitiator is present in an amount ranging from about 0.1 wt. % to about 5 wt. %.

Moreover, in some embodiments, a polymerizable liquid described herein can further comprise one or more sensitizers. A sensitizer can be added to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in the polymerizable liquid in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the polymerizable liquid.

Polymerizable liquids described herein can further comprise one or more additional additives including, but not limited, to pigments, light stabilizers and/or UV absorbers. In some embodiments, for example, a polymerizable liquid comprises curcumin and/or derivatives and analogues thereof. Pigments, lights stabilizers and/or UV absorbers can generally be present in individual amounts less than 2 weight percent or less than 1 weight percent, based on total weight of the polymerizable liquid.

As described herein, the polymerizable liquid does not exhibit crystallization over a period of 28 days at a storage temperature of 5-10° C. Crystallization of a polymerizable liquid or absence thereof is determined according to the following protocol. A minimum of 10 g of polymerizable liquid is placed in an open container for exposure to the ambient environment for seeding with impurities and/or particles, such as dust. The seeded polymerizable liquid is transferred to a 20 ml scintillation vial formed of clear glass. A 35 mm×12 mm strip of brown high density polyethylene (HDPE) cut from a Nalgene bottle is placed in the scintillation vial with the seeded polymerizable liquid. The loaded scintillation vial is then placed in a refrigerator having a stable temperature of 5-10° C. The polymerizable liquid in the scintillation vial is checked for crystal formation at regular intervals over the 28 day period. Crystal formation visible to the eye indicates the polymerizable liquid fails the test and does not meet the requirement of no crystallization over a period of 28 days at a storage temperature of 5-10° C.

In another aspect, methods of printing three-dimensional articles are described herein. A method comprises providing a polymerizable liquid comprising at least 20 weight percent isocyanurate polyacrylate; a photoinitiator component; and a crystallization inhibitor component comprising monomeric curable material, oligomeric curable material or mixtures thereof, wherein the polymerizable liquid does not exhibit crystallization over a period of 28 days at a storage temperature of 5-10° C.

Components of the polymerizable liquid employed in methods described herein can comprise any composition and/or properties described hereinabove. Additionally, the components can be present in the polymerizable liquid in any amount described hereinabove. The isocyanurate polyacrylate, for example, can be present in an amount of 30-60 weight percent, based total weight of the polymerizable liquid, in some embodiments.

The polymerizable liquid is cured with light to form the article. The light curing process can comprise one or multiple steps. In some embodiments, the polymerizable liquid is initially exposed to a sufficient amount of light required to convert the liquid into a soft solid. The soft solid is a green cured state of the article. Additional photoreaction is required to complete the polymerization process and obtain the full mechanical strength of the article and achieve other material properties. This additional photoreaction can be completed by placing the green cured article in a light chamber and providing sufficient time, temperature, and light intensity at the correct wavelengths to complete the polymerization process. As used herein, the term "post-light curing" refers to the state of the article after completion of the full light initiated polymerization process. Therefore, a post-light cured article has not been subjected to further non-light induced polymerization processes, such as thermal curing.

Articles formed according to methods described herein can have a post-light curing heat deflection temperature of at least 100° C. In some embodiments, the article has a post-light curing heat deflection temperature of at least 200° C. or at least 250° C. The article, in some embodiments, can have a post-light curing heat deflection temperature selected from Table I.

TABLE 1

| Printed Article Heat Deflection Temp. (° C.) |
| --- |
| 140-250 |
| 190-250 |
| 215-250 |
| >250 |
| ≥300 |

In corresponding to post-light cured articles, the heat deflection values recited herein are achieved without one or more additional steps, such as thermal curing. Accordingly, articles having heat deflection values described herein can be produced via light curing alone, thereby saving cost and time of additional processing steps, including heat curing.

In addition to high heat deflection temperatures, the article printed according to methods described herein can have desirable storage modulus at high temperatures. In some embodiments, the article has a storage modulus of at least 1500 MPa at 200° C. Moreover, the article can have a storage modulus greater than 1000 MPa at 250° C.

In some embodiments, the article is formed via a layer-by-layer process, wherein layer formation is administered via deposition and irradiation of a layer of the polymerizable liquid.

Layers of polymerizable liquids can be deposited according to an image of the 3D article in a computer readable format during formation of the three-dimensional article. The polymerizable liquid can be deposited according to preselected computer aided design(CAD) parameters. Moreover, in some cases, one or more layers of the polymerizable liquid described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a polymerizable liquid described herein onto a substrate, such as a build pad of a 3D printing system. In addition, in some embodiments, a method described herein further comprises supporting at least one of the layers of the polymerizable liquid with a support material. Any support material not inconsistent with the objectives of the present disclosure may be used.

It is also possible to form a 3D article from a polymerizable liquid described herein using stereolithography. For example, in some cases, a method of printing a 3D article comprises retaining the polymerizable liquid in a container and selectively applying energy to the polymerizable liquid in the container to solidify at least a portion of a polymerizable liquid, thereby forming a solidified layer that defines a cross-section of the 3D article. Additionally, a method described herein can further comprise raising or lowering the solidified layer to provide a new or second layer of polymerizable liquid, followed by again selectively applying energy to the polymerizable liquid in the container to solidify at least a portion of the new or second polymerizable liquid that defines a second cross-section of the 3D article. Further, the first and second cross-sections of the 3D article can be bonded or adhered to one another in the z-direction (or build direction corresponding to the direction of raising or lowering recited above) by the application of the energy for solidifying the polymerizable liquid. Moreover, selectively applying energy to the polymerizable liquid in the container can comprise applying electromagnetic radiation, such as UV and/or visible radiation, having a sufficient energy to initiate polymerization of the polymerizable material as described herein. In addition, in some cases, raising or lowering a solidified layer of polymerizable liquid is carried out using an elevator platform disposed in the container of fluid build material. A method described herein can also comprise planarizing a new layer of polymerizable liquid provided by raising or lowering an elevator platform. Such planarization can be carried out, in some cases, by a wiper or roller.

In another aspect, printed 3D articles are described herein. In some embodiments, a printed 3D article is formed from any of the polymerizable liquids described herein. 3D articles formed from polymerizable liquids described herein can have heat deflection temperatures and/or storage moduli described above.

These foregoing embodiments are further illustrated in the following non-limiting examples.

EXAMPLES

Table 2 provides formulations of polymerizable liquids according to some embodiments described herein.

TABLE 2

| Chemical | Formula 1 | Formula 2 | Formula 3 | Formula 4 |
| --- | --- | --- | --- | --- |
| Urethane dimethacrylate | 19-21 | 19-21 | 29-31 | 29-31 |
| Isocyanurate polyacrylate | 29-31 | 29-31 | 29-31 | 29-31 |
| Cycloalkane diacrylate | 16-18 | 16-18 | 25-27 | 25-27 |
| Polyallyl isocyanurate | 18-20 | 18-20 | — | — |
| Isobornyl acrylate | 10-12 | 8-10 | 10-12 | 8-10 |
| Curcumin | — | — | — | — |
| Light Stabilizer | — | 1-2 | — | 1-2 |
| UV Absorber | — | 0.5-1 | — | 0.5-1 |
| Photoinitiator | 3 | 3 | 3 | 3 |

Table 3 provides formulations of polymerizable liquids according to some embodiments described herein.

TABLE 3

| Chemical | Formula 5 | Formula 6 | Formula 7 | Formula 8 | Formula 9 | Formula 10 |
|---|---|---|---|---|---|---|
| Urethane dimethacrylate | 19-21 | 19-21 | 19-21 | 19-21 | 19-21 | 19-21 |
| Isocyanurate polyacrylate | 34-36 | 34-36 | 29-31 | 29-31 | 29-31 | 33-35 |
| Cycloalkane diacrylate | 20-22 | 20-22 | 16-18 | 16-18 | 16-18 | 8-10 |
| Polyallyl isocyanurate | 20-22 | 18-20 | 27-29 | 29-31 | 29-31 | 32-34 |
| Isobornyl acrylate | — | — | — | — | — | — |
| Curcumin | — | — | — | — | — | 0.005-0.01 |
| Light Stabilizer | — | 1.5-2 | 1.5-2 | — | — | — |
| UV Absorber | — | 0.5-1 | 0.5-1 | — | — | — |
| Photoinitiator | 3 | 3 | 3 | 3 | 3 | 3 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of printing a three-dimensional article comprising:
   providing a polymerizable liquid comprising:
      at least 20 weight percent isocyanurate polyacrylate, based on total weight of the polymerizable liquid;
      a photoinitiator component; and
      a crystallization inhibitor component comprising monomeric curable material, wherein the monomeric curable material comprises a heterocycle, and wherein the polymerizable liquid does not exhibit crystallization over a period of 28 days at a storage temperature of 5-10° C.; and
   curing the polymerizable liquid with light to form the article, the article having a post-light curing heat deflection temperature of at least 100° C. according to ASTM D648 at a stress of 1.82 MPa.

2. The method of claim 1, wherein the post-light curing heat deflection temperature is at least 140° C.

3. The method of claim 1, wherein the post-light curing heat deflection temperature is at least 200° C.

4. The method of claim 1, wherein the post-light curing heat deflection temperature is at least 250° C.

5. The method of claim 1, wherein the post-light curing heat deflection temperature is at least 300° C.

6. The method of claim 1, wherein the polymerizable liquid is provided in a layer-by-layer process.

7. The method of claim 1, wherein the article has a storage modulus greater than 1500 MPa at 200° C.

8. The method of claim 1, wherein the isocyanurate polyacrylate is present in an amount of 30-60 weight percent.

9. The method of claim 1, wherein the heterocycle has two or more unsaturated substituents.

10. The method of claim 9, wherein the heterocycle is a polyallylated heterocycle.

11. The method of claim 10, wherein the polyallylated heterocycle comprises polyallyl isocyanurate.

12. The method of claim 11, wherein a ratio of the isocyanurate polyacrylate to the polyallyl isocyanurate is 1:4 to 4:1.

13. The method of claim 11, wherein the polyallyl isocyanurate is present in an amount of 10-30 weight percent based on total weight of the polymerizable liquid.

* * * * *